Figure 1:
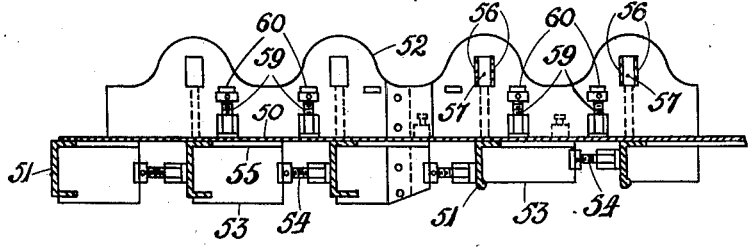

Oct. 26, 1926.

R. ROBERTS 1,604,483

ASSEMBLY AND WELDING OF PLATED STRUCTURES

Filed Feb. 29, 1924     7 Sheets-Sheet 1

Robert Roberts
INVENTOR
By [signature]
his Attorney.

Oct. 26, 1926.  
R. ROBERTS  
1,604,483  
ASSEMBLY AND WELDING OF PLATED STRUCTURES  
Filed Feb. 29, 1924  7 Sheets-Sheet 3
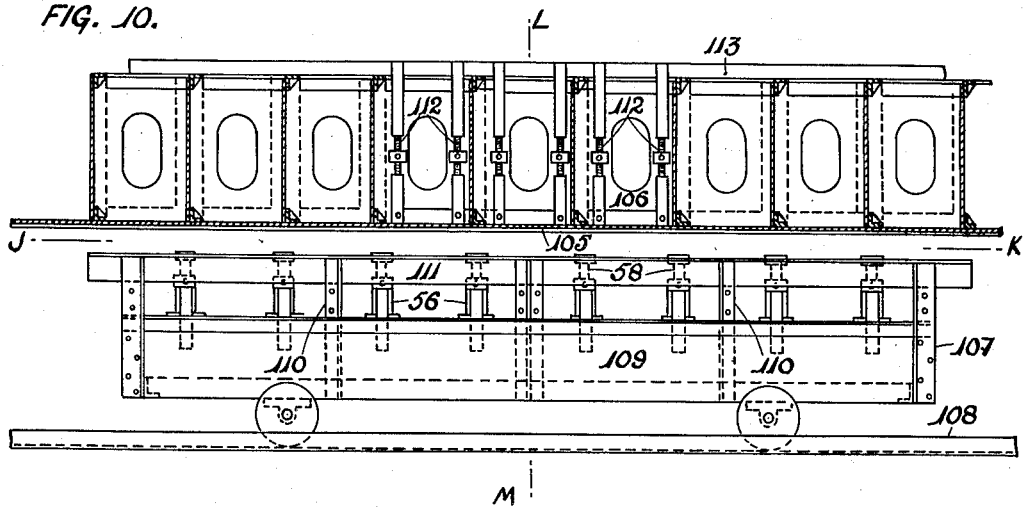
FIG. 10.
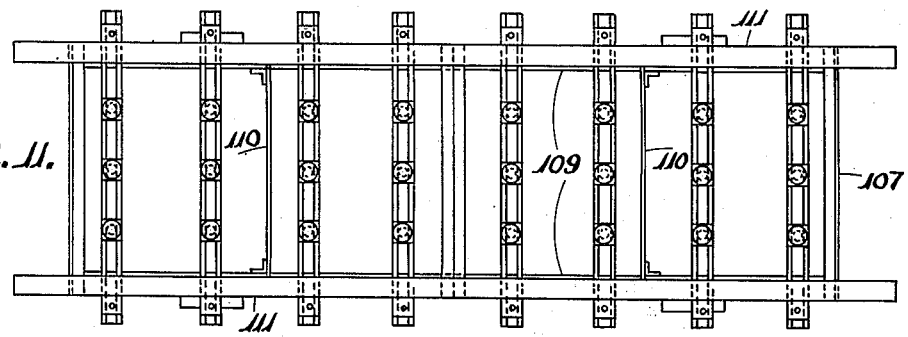
FIG. 11.
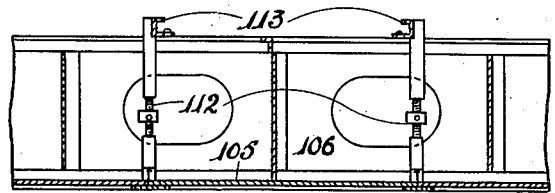
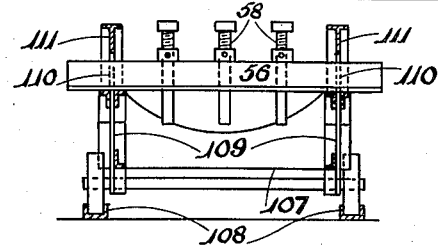
FIG. 12.
Robert Roberts
INVENTOR;
By (signature)
his Attorney.

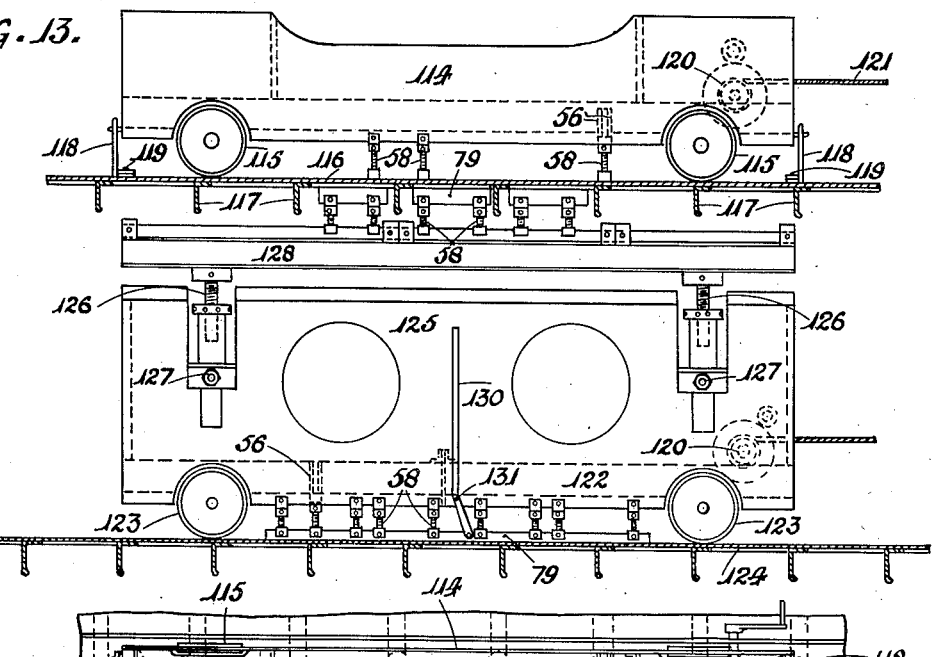
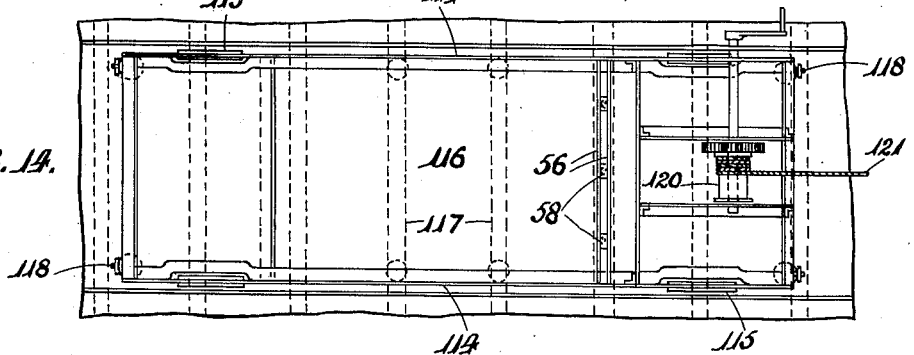
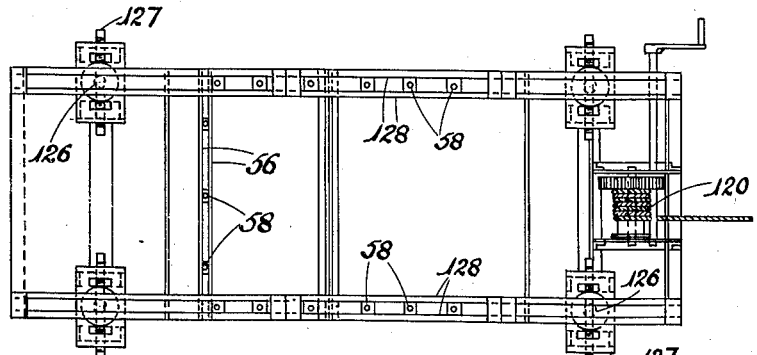

Oct. 26, 1926.
R. ROBERTS
1,604,483
ASSEMBLY AND WELDING OF PLATED STRUCTURES
Filed Feb. 29, 1924    7 Sheets-Sheet 5
FIG. 17.
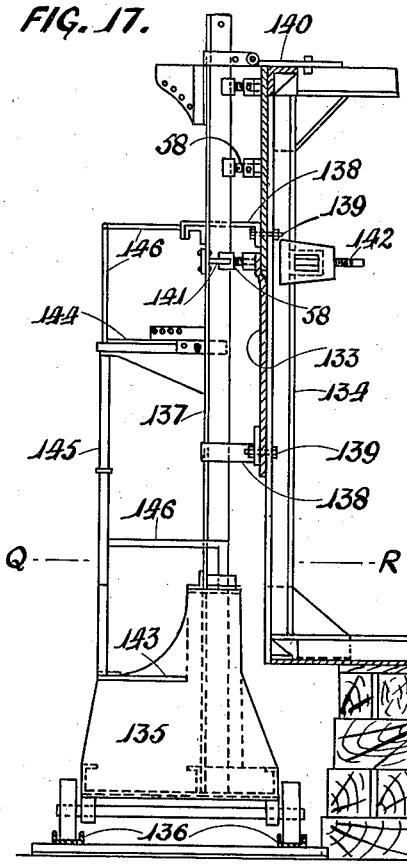
FIG. 16.
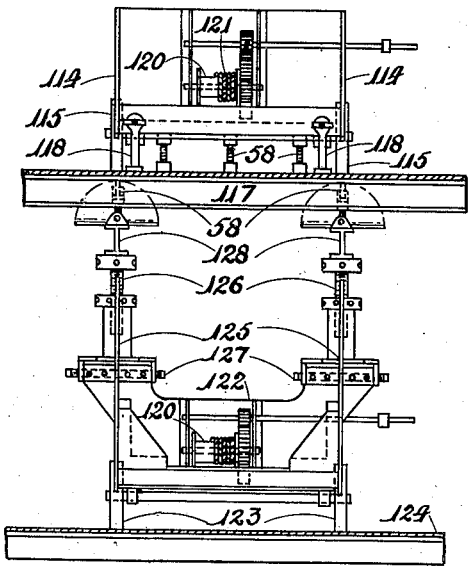
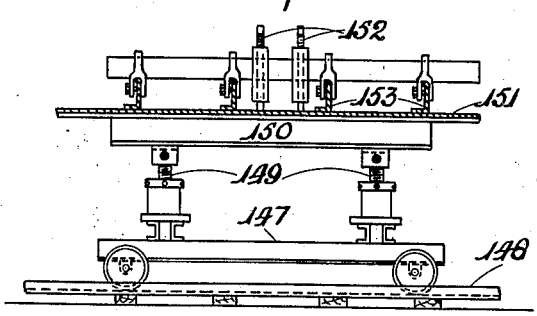
FIG. 20.
Robert Roberts
INVENTOR;
By (signature)
his Attorney.

Oct. 26, 1926.
R. ROBERTS
1,604,483
ASSEMBLY AND WELDING OF PLATED STRUCTURES
Filed Feb. 29, 1924
7 Sheets-Sheet 6

Robert Roberts
INVENTOR;
By
his Attorney.

Oct. 26, 1926.

R. ROBERTS 1,604,483

ASSEMBLY AND WELDING OF PLATED STRUCTURES

Filed Feb. 29, 1924 7 Sheets-Sheet 7

Robert Roberts
INVENTOR;
By
his Attorney.

Patented Oct. 26, 1926.

1,604,483

UNITED STATES PATENT OFFICE.

ROBERT ROBERTS, OF NEWCASTLE-UPON-TYNE, ENGLAND.

ASSEMBLY AND WELDING OF PLATED STRUCTURES.

Application filed February 29, 1924, Serial No. 696,101, and in Great Britain March 8, 1923.

This invention relates to the assembly and welding of structures composed of parallel, tapered or angled strakes of plating attached to and supported by rigid frames. Heretofore, so far as I am aware, the difficulties experienced in the construction and welding of plated structures on rigid frames have rendered it necessary to adopt the practice which is in general use upon riveted structures of the same type, and it has therefore been necessary to perforate the structural and plate components and the seams, butt-strapped joints and end connections of the plating in an extensive manner to insert draw-bolts therethrough in order to draw the joints into close contact in readiness for welding. By the employment of numerous draw-bolts as joint closing members in this manner, the components, after erection and welding, are fixed, united and clamped together so as to form a rigid expanse of plating. No provision having been made for permitting the temperature movements in the components which arise during welding, the procedure hitherto adopted has increased the difficulties met with when uniting the plates to the structural frames and also at the seams, butt-strapped edges and end joint connections and made it impossible to obtain a welded structure wherein the unsupported areas of plating have the same strong rigid character as in a riveted structure, and, by decreasing the efficiency and durability of the welded joints, has considerably impeded the progress of the welding art in its general application to shipbuilding, tank-building and similar large constructional work.

The object of the present invention is to provide an improved method of preparing and electrically welding the components of such structures such as the shells, decks, tanks, bulkheads and superstructures of ships or pontoons, or circular or prismatic tanks, whereby I am enabled to dispense with the use of through service closing bolts through the seams, edge joints, and end joint connections and thereby liberate each plate from rigid connection to the adjoining components, and whereby also I am enabled to limit the insertion of closing bolts through the plating and structural support members to a minimum number where it is necessary to maintain and support the components and structure in position. By separating the components and holding the constituent parts together in a non-rigid manner, I am enabled to bring into operation novel means for positioning the components before and during welding whereby to adjust the components and close the parts and joints together ready for welding, either where each unit is separately erected and welded, or where several units are assembled and welded together before being erected and welded to the structure.

According to this invention, I provide a method of preparing the components of structures composed of strakes of plating attached to and supported by rigid frames for welding which consists in employing adjustable pressure devices which do not penetrate the components and are applied separately to sections of either or both sides of the plates or the like and adapted to close the parts and joints together ready for welding, said appliances avoiding the perforation of the plates and their supporting members for the insertion of closing bolts at the seams, butt edges, end joints and structural connections of numerous plates on the decks, tanks, shells and like places. In places where it is essential to provide support for the components, a minimum number of through service bolts are employed to support and maintain each component in position and provide attachments for the pressure appliances used in various positions on these structures. The use of through service bolts is limited wherever possible and perforations of the structural and plate components avoided by welding studs, pins or the like to the structural or plate components to form supporting attachments, and, upon completing the welding of each unit, these studs or the like are cut off level with the components and permanently welded thereinto. Upon blank or other plating permanently welded to the structural supports, I may also weld studs, pins or the like to support or anchor the pressure appliances, said temporary connections being cut off upon completing the welding. Upon circular or prismatic tanks or the like where structural supports are dispensed with or limited in number, I limit the use of through service bolts to a few in each plate, and, by means of welded supports and stay members attached thereto, provide support for each unit which, upon erection, is adjusted and closed by internal and external pressure devices which coact to close the circumferential and end vertical joints before the welding operation. To support and avoid distortion of the plate components during erection, I may attach a portable pressure appliance or appliances, or a frame or frames for supporting said appliances, to the plate component before lifting it into position and thereby facilitate the closing and welding operations.

By the above methods I retain the full area of the joints and position and support the components in a non-rigid manner during the welding. By avoiding the rigidity inherent in plate structures held and closed together by numerous through service bolts (which has been the method hitherto usually adopted), I am enabled to carry out a novel method of welding wherein each plate or unit, though it may be maintained in position by bolts or welded attachments as above described, is held with sufficient elasticity to permit it to adjust itself to the temperature changes incidental to welding and the slight accretion of material resulting therefrom. By welding each plate to the structural members in a spreading manner commencing at the plate centre, or on the centre line of an end structural member, and working away from the centre in lateral and longitudinal directions and so causing the heat to flow towards the extremity or extremities of the plate or member, each unit is free to act in an expansive semi-elastic manner which automatically relieves and therefore neutralizes the internal heat stresses during each sectional and bodily welding operation. After welding a number of adjoining plates to the structural members, the plate seams or edge joints are united together, and finally the end joints are welded by this separate expansive method. By this procedure I release heat strains in the structural and joint attachments and thereby obtain superior and more durable welding wherein the strength of the joints equals the strength of the material forming the structure.

In carrying my invention into practice, I employ a frame carrying adjustable pressure members, or a plurality of said frames, whereby the pressure of said pressure members can be applied externally of the plating on either or both sides thereof and employ to close and press the joints together. The pressure members may be screws, or hydraulic rams, or other suitable devices for adjustably applying pressure. The frames carrying the adjustable pressure members may be variously supported to adapt them to different conditions and types of welded joints, and suitable anchor attachments may be welded where required to the girders or other structural members and/or to the plating. The pressure appliances are designed to cover plates of various breadths and extend over various lengths of each plate, and they are positioned at a distance from the joint which allows room for the welding operation. A single pressure appliance is sufficient to close and press plating to girders or like structural supports, but for closing plate joints and other unsupported attachments, a pair of coacting pressure appliances is employed, one on each side of the structure, the pressure in each case being maintained during the welding operation. The pressure appliances are modified to suit unobstructed, obstructed and confined places and to suit components of a light or heavy character.

I will more fully describe my invention with reference to the accompanying drawings which illustrate several constructions of pressure appliances and applications thereof in accordance with my invention. Referring to the drawings:—

Figure 2:
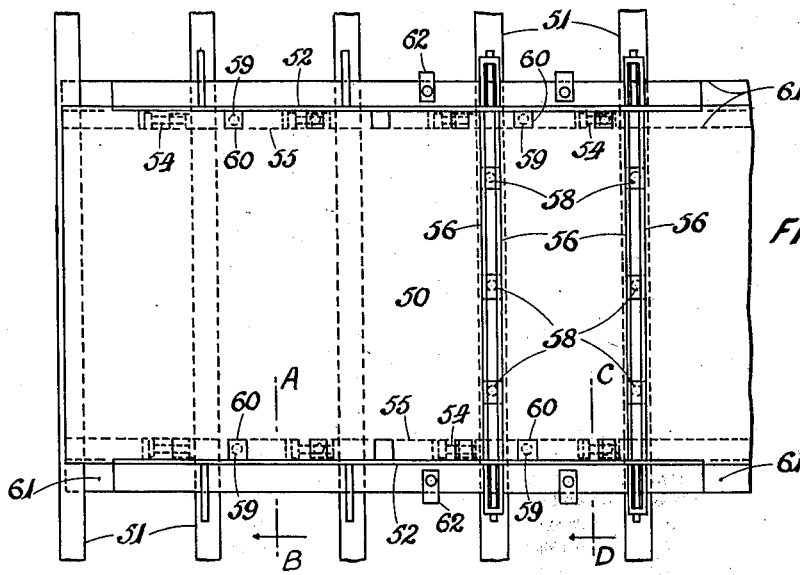
Figure 3:
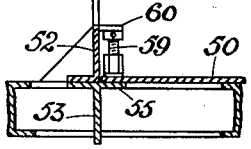
Figure 4:
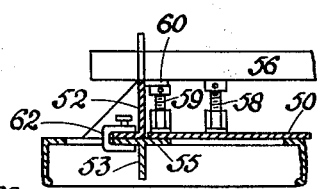

Figure 1 is an elevation, Figure 2 is a plan, and Figures 3 and 4 sections on the lines A—B and C—D respectively in Fig. 2, illustrating a pressure appliance in accordance with my invention applied to a blank strake of horizontal plates 50 to be welded to girders 51. The pressure appliance comprises two longitudinal intercostal frames 52 disposed one along each side of the plate to be welded, said frames extending over several girders and having depending T-section projections 53 bearing on the girders. Adjustable horizontal pressure screws 54 press the girders against the projections 53 thus positioning the girders and firmly securing the frames 52 thereto. Flanges 55 along the sides of the frames 52 form means whereby the sides of the plate can be straightened between the girders 51 by pressure screws 59 which are applied to the sides of the plates and bear against the brackets 60 on the frames 52.

The frames 52 carry pairs of transverse beams 56 which are passed through opposite pairs of apertures 57 in the frames. Vertical pressure screws 58 are slidably carried by the beams 56 and bear between said beams and the upper face of the plate 50 to apply pressure thereto and close the plate onto the girders 51 to which it is to be welded. In the example illustrated, butt straps are welded to the plate 50 as indicated at 61, and in this case screw clamps 62 are applied to straighten the plate and fair the straps to the girders 51.

Figure 5:
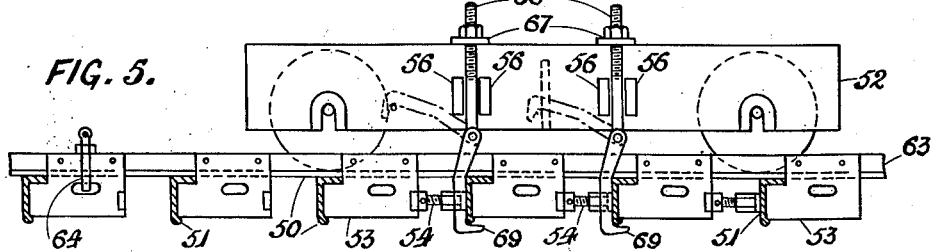

Figure 5 is a similar view to Fig. 1 illustrating a modified pressure appliance for use on blank strakes of heavy horizontal plates 50. In this example, channels 63 form a track for a wheeled pressure appliance comprising side frames 52 carrying pairs of transverse beams 56 which slidably support the vertical pressure screws 58. The channels 63 have depending intercostal plates 53 attached to their outer flanges whereby the girders 51 are positioned by the horizontal pressure screws 54, and, where necessary, clamps 64 are applied to straighten the plate 50 to the channels. The wheeled pressure appliance is temporarily anchored to the girders 51 by plates 67, bolts 68 and hinged claws 69, and the pressure screws 58 carried by the beams 56 are then applied to close the plates 50 onto the girders 51 ready for welding.

Figure 6:
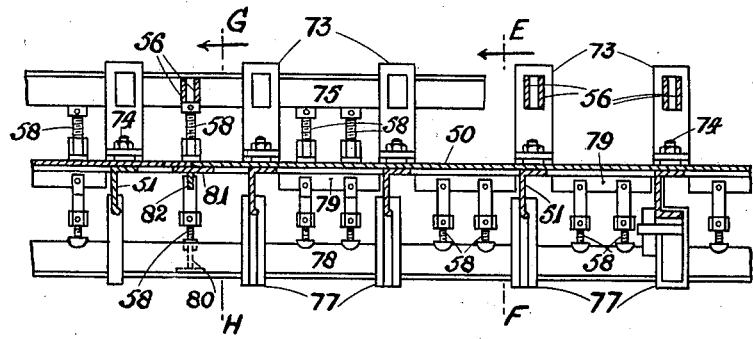
Figure 7:
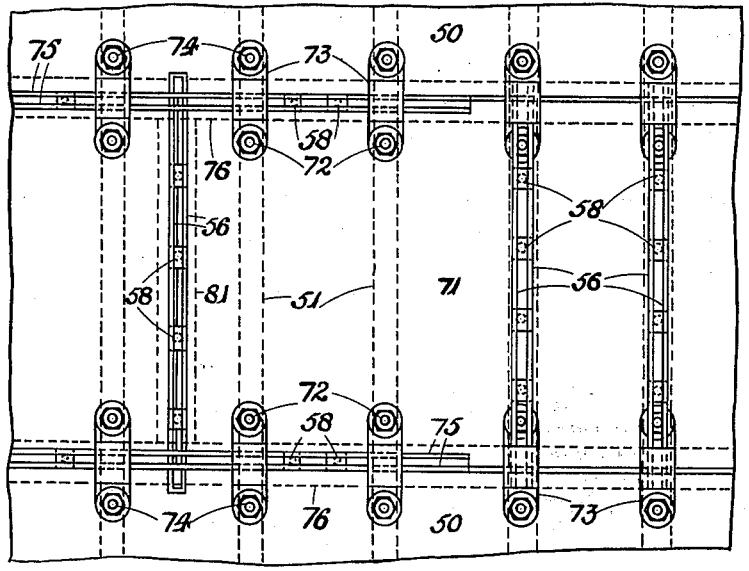
Figure 8:
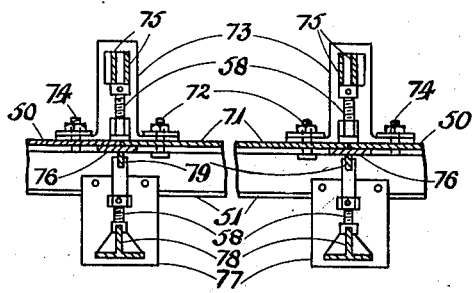
Figure 9:
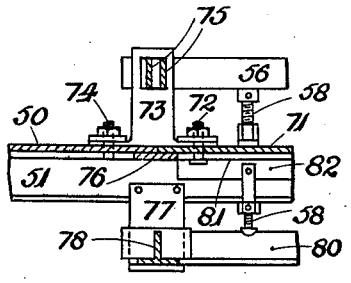

Figure 6 is an elevation, Figure 7 a plan, Figure 8 is a section on the line E—F in Fig. 6, and Figure 9 is a part section on the line G—H in Fig. 6 illustrating pressure appliances in accordance with my invention adapted for general application and shown as applied to a filling strake of plates 71 inserted between blank strakes of plates 50 which have been previously welded to the girders 51, each plate 71 being attached to the girders 51 by two through service bolts 72 inserted through each girder to adjust the plates. The pressure appliances in this example comprise stands 73 temporarily anchored partly by the bolts 72 and partly by pins 74 welded to the adjoining plates 50. The stands 73 support the pairs of transverse beams 56 carrying the vertical pressure screws 58 used to close the plates 71 onto the girders 51 ready to be welded thereto. The stands 73 are also used to support pairs of longitudinal beams 75 which slidably carry the vertical pressure screws 58 used to close the sides of the plates 71 onto the butt straps 76 of the plates 50 ready for welding the joint. To support the butt straps 76 from below, brackets 77 are connected to the girders 51, said brackets being of various forms to suit the girders and supporting longitudinal girders 78 which support vertical pressure screws 58 which support intercostal closing bars 79 bearing against said straps. The longitudinal girders 78 also carry transverse girders 80 which support vertical pressure screws 58 carrying a transverse closing bar 82 bearing on the underface of the butt strap 81. The bars 82 support the strap 81 beneath the plates 71, the ends of the plates being closed onto said strap by the vertical pressure screws 58 above them, ready to be welded thereto. To avoid any restriction of temperature movements in the plates, the holes for the bolts 72 are adjusted so that each plate adapts itself to the temperature changes operating in it, any accretion of material being liberated and heat stresses neutralized when uniting the plate to the girders 51.

Figure 10 is an elevation, Figure 11 a plan on the line J—K in Fig. 10, and Figure 12 a section on the line L—M in Fig. 10, illustrating another construction of pressure appliance in accordance with my invention adapted to transport, erect and close the plates 105 to the frames 106 on a ship's bottom. A carriage 107 running on tracks 108 resting on the ground beneath the ship's bottom comprises longitudinal side frames 109 carrying adjustable transverse beams 56 slidingly supporting vertical pressure members 58 to lift and close the plates 105 onto the underfaces of the frames 106. Brackets 110 support longitudinal side girders 111 upon which the plates 105 rest during transport, each plate, when it has been brought by the carriage 107 directly below its place of erection, being lifted vertically by the member 58, positioned correctly, and then closed onto the frames 106 and welded thereto. This procedure is repeated plate by plate until the alternate blank strakes are completed; the filling strakes are then similarly erected, closed onto the frames 106 and the butt straps along the edges of the adjacent strakes, and welded thereto. Pressure screws 112 are temporarily supported by longitudinal beams 113 attached to the upper faces of the top angle 106 to close and press the seams and joints together for welding when supported by the carriage 107, or by the carriage 147 hereinafter described and illustrated in Figs. 17 and 20, which is also applicable. In many cases the plates are closed and welded without perforating the plates or frames, but where supporting members are used, studs or pins may be welded to the plates and frames where required to form attachments which are afterwards cut off flush with these components and welded permanently thereinto. Where necessary anchor stays or supports are applied from the carriage to the structure.

Figure 13 is an elevation, Figure 14 is a plan of the upper carriage. Figure 15 is a plan of the lower carriage, and Figure 16 is an elevation at right angles to Fig. 13, illustrating two travelling carriages supporting pressure appliances according to my invention for use on large areas of deck or like plating. The upper carriage comprises a rectangular frame 114 supported by wheels 115 running on the seams of the plating 116 and carries adjustable transverse beams 56 in a central opening, said beams slidingly supporting vertical pressure screws 58 bearing on the upper face of the plating 116. Vertical pressure screws 58 are also applied between the lower side edges of the frame 114 and the upper face of the plating 116 where required. These pressure screws 58 are employed for closing the plating 116 onto the girders 117 and also to close the seams or edge joints ready for welding as hereinbefore described. The carriage is temporarily anchored by attachments 118 to pins 119 welded to the plating 116 and subsequently cut off flush therewith. A hand or power operated winch 120 is provided for travelling the carriage, or controlling the travel thereof on inclined surfaces, by winding in or paying out an anchored cable 121.

The lower carriage comprises a rectangular frame 122 supported by wheels 123 running on the seams of the plating 124 and carries upwardly extending girders 125 supporting screw jacks 126 transversely adjustable by screws 127. The jacks 126 carry girders 128 forming bases for hinged vertical pressure screws 58 carrying intercostal closing bars 79 for application to the underside of the plating 116 for supporting and closing the joints thereof. After use the hinged screws 58 can be swung into either of the positions indicated in dotted lines in Fig. 16 clear of the girders 117, and the carriage travelled to the next station. Adjustable transverse beams carrying upwardly acting vertical pressure screws may be supported between the girders 128 where desired. The lower carriage may be temporarily anchored in the same manner as the upper carriage, and is provided with a winch 120 for the same purpose as the winch of the upper carriage. Hinged downwardly-acting vertical pressure screws 58 carrying a continuous closing bar 79 are also provided along the bottom side edges of the frame 122 as shown in Fig. 13, said bar being attached to the lower end of a lever 130 pivoted to the frame 122 at 131 so that, by slightly releasing said screws and swinging said lever to the right, the closing bar can be raised from off the plating 124 to permit the carriage to be travelled to the next station. Downwardly-acting vertical pressure screws 58 (Fig. 15) are also supported by adjustable transverse beams 56 carried by the frame 122.

The upper and lower carriages will conveniently carry the operating tools, and may be adapted to transport the plant for the welding operations. The lower carriage also provides staging for the operators closing and welding the underside of the plating 116 thus dispensing with the use of some of the usual staging between decks and in similar places. In suitable positions, the carriages themselves may be utilized as stationary unattached pressure appliances to close, by their weight, the plates onto their supporting girders and the plate joints at the points of contact of the carriage wheels with the plating, or through portable tracks for the wheels laid on the plate joints. After welding each section, the carriage is travelled as required to close the next section. By adjusting the travel of the carriage to synchronize with the speed of the welding operation, the carriage may be employed as a travelling pressure appliance, and the closing and welding operations simultaneously and progressively effected. The carriages may be used to support and guide the welding appliances.

Figure 18:
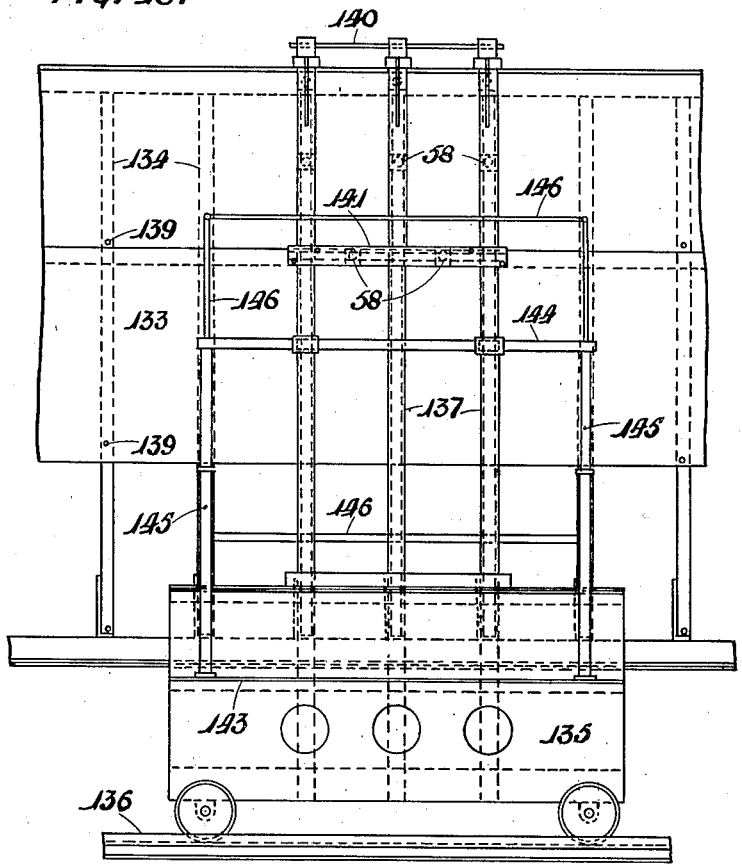
Figure 19:
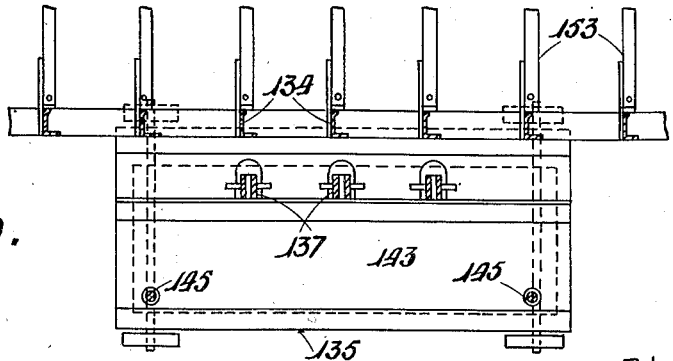

Figures 17 and 18 are elevations at right angles, Figure 19 is a plan section on the line Q—R in Fig. 17, and Figure 20 is a vertical section on the line S—T in Fig. 17 illustrating wheeled pressure appliances according to my invention for use on small vessels or other structures. In this example, the appliance for closing the vertical plating 133 to the vertical frames 134 comprises a wheeled carriage 135 which travels on a track 136 and supports upwardly extending pillars 137 which may be adjusted vertically in their sockets in the carriage. The plates 133 are supported, after being raised into position, by bolts 139 which position and fair the components. Temporary attachments between the pillars and the structure are made by stays 138 (Fig. 17) to the plate supporting bolts 139. At the top a temporary hinged connection 140 is employed. The pillars 137 support horizontally-acting external plate-closing screws 58 and similar screws 58 are supported by horizontal beams 141 attached to the pillars where required to close the plate joints. Horizontally-acting internal plate-closing screws are provided as indicated at 142 supported from the vertical girders 134 as described in connection with Figs. 6 to 9. The pillars 137 also support a staging 144 for the operators, the outer corners of said staging being carried by tubular stanchions 145. The staging 144 is adapted to be raised and lowered as required, and temporarily clamped to the pillars 137. Rails 146 protect the operators on the upper staging 144 and on a fixed staging 143 below same. 147 is a small wheeled carriage running on tracks 148 and provided with screw jacks 149, preferably transversely adjustable, supporting joint-closing bars 150 for application to the underside of the bottom plating 151. Vertically-acting internal plate-closing screws are provided as indicated at 152 supported from the horizontal girders 153 as described in connection with Figs. 6 to 9. Where several components are assembled into a large section previous to welding upon the structure, I use the hereinbefore described portable sectional or wheeled pressure appliances to close the parts together for welding to form the section, and I follow the expansive method both during the welding of the section itself and the welding of the section to the structure.

Figure 21:
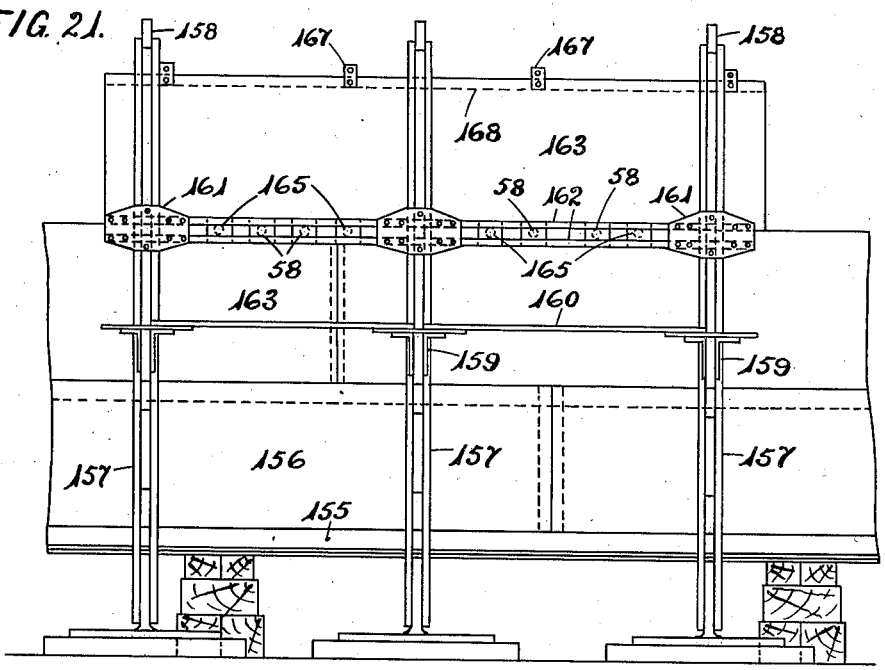
Figure 22:
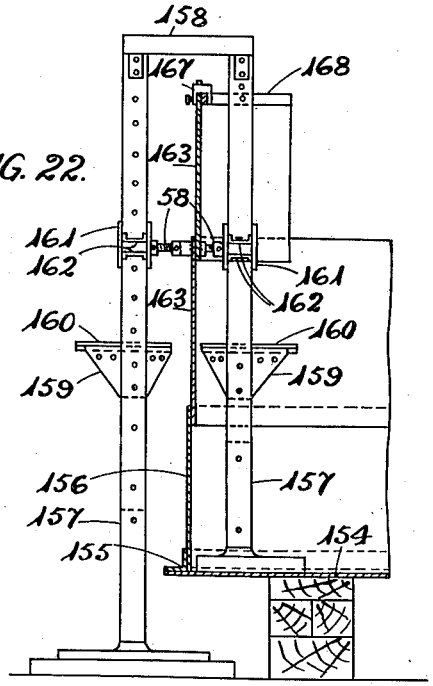
Figure 23:
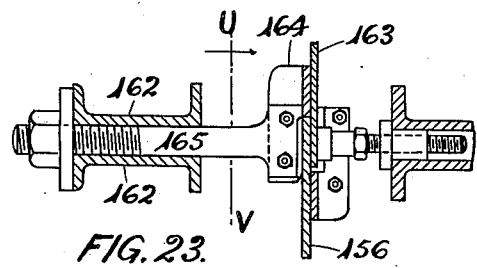
Figure 24:
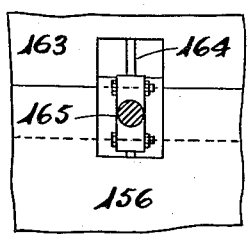

Figures 21 and 22 are elevations at right angles illustrating another form of pressure appliance according to my invention for use on the circular plating of a tank wherein the frames are dispensed with or reduced in number; Figure 23 is an elevation and Figure 24 a section on the line U—V in Fig. 23 of T lug attachments used therewith. The bottom plates 154 are positioned in blank form, or have welded stud or pin connections to support the parts for closing and welding the joints by any of the appliances hereinbefore described which are suitable for this purpose. The circular foundation angle 155, prepared in lengths to suit two circumferential plates, is assembled, each length being clamped and welded to two plates 156 of the bottom strake, and the sections thus formed are lifted into position and clamped to the bottom plating and welded thereto as separate units as hereinbefore described until the bottom strake is completed. Suitably spaced movable pillars 157 are erected both externally and internally of the plating and tied together at the top by bars 158. The pillars carry adjustable brackets 159 to support stagings 160, and diamond brackets 161 to support horizontal beams 162. The plates 163 of the second and succeeding strakes are prepared for erection by temporarily welding several T lug attachments 164 (Figs. 32 and 24) to one or both faces of each plate. These attachments form internal and external support forks into which the plate slides and which slip over the face of the plates 156 of the strake previously erected. The attachments 164 support and position the plates 163 horizontally, these plates being stationed vertically by bolts in the joints. The attachments 164 also provide means for attaching stays 165 to the beams 162. Carried by the beams 162 and disposed between the stays 165 are external pressure screws 58 which coact with internal pressure screws 58 to close the horizontal seams. The pillars 157 are extended upwardly as required. A temporary suitably curved horizontal bar 168 attached to each plate by clamps 167 retains the plate in shape, provides a lifting attachment for erecting the plate into position, and forms means for attaching stay connections from the pillars 157 during closing and welding. The T-lug attachments 164 are subsequently cut off after use, and the clamps 167 and bar attachments 168 removed. As each plate is supported and maintained in correction position, the plates, when closed and welded, form a true circle.

It will now be seen that, by the adoption of plate supports and pressure appliances as herein described, the use of closing bolts and the corresponding perforations of the plates and girders are dispensed with. The through service bolts which I employ for supporting and maintaining the plating in position are so few in number that they do not appreciably affect the strength of the structure. I am therefore enabled, by the method employed, to completely dispense with the use of bolts in the seams, butt edges and end joint connections, and bring into operation a novel method of welding metallic plated structures by uniting each plate or member as a separate unit into the structure. The present invention provides a simple and inexpensive process employing closing apparatus of simple construction and easy manipulation in the form of portable, sectional, fixed or wheeled pressure appliances whereby the welding of plated structures is facilitated and superior work obtained.

What I claim as my invention, and desire to secure by Letters Patent is:—

1. In the welding of structures, composed of strakes of plating attached to and supported by rigid frames, wherein the welding is proceeded with in a separate, sectional and spreading manner from the centre or one end of each plate outwards in lateral and longitudinal directions the use of an adjustable non-perforating pressure appliance comprising an intercostal frame disposed along each side of the plates to be welded, depending projections carried by said frames bearing on the structural girders, horizontal pressure-exerting members disposed between said projections and said girders, brackets on said frames, pressure-exerting members between said brackets and the plates to be welded, transverse beams carried by said frames, and vertical pressure-exerting members disposed between said beams and the plate to be welded.

2. In the welding of structures, composed of strakes of plating attached to and supported by rigid frames, wherein the welding is proceeded with in a separate, sectional and spreading manner from the centre or one end of each plate outwards in lateral and longitudinal directions, the use of adjustable non-perforating pressure appliances comprising side frames, wheels supporting said frames, tracks for said wheels supported by the structural girders, depending projections carried by said tracks, said projections bearing on the structural girders, horizontal pressure-exerting members disposed between said projections and said girders, means for temporarily anchoring said pressure appliances to the structural girders, transverse beams carried by said frames, and vertical pressure-exerting members disposed between said beams and the plates to be welded.

3. In the welding of structures, composed of strakes of plating attached to and supported by rigid frames, wherein the welding is proceeded with in a separate, sectional and spreading manner from the centre or one end of each plate outwards in lateral and longitudinal directions, the use of adjustable non-perforating pressure appliances comprising stands temporarily anchored to the structure, longitudinal and transverse beams carried by said stands, vertical pressure exerting members disposed between said beams and the external side of the plates to be welded, brackets attached to the structural girders below said plates, longitudinal and transverse beams carried by said brackets, and vertical pressure-exerting members disposed between said beams and the internal side of the plates to be welded.

4. In the welding of structures, composed of strakes of plating attached to and supported by rigid frames, wherein the welding is proceeded with in a separate, sectional and spreading manner from the centre or one end of each plate outwards in lateral and longitudinal direction, the use of an adjustable non-perforating pressure appliance comprising a wheeled carriage, upwardly-extensible pillars carried thereby, means for temporarily anchoring said carriage, adjustable brackets carried by said pillars, horizontal beams carried by said brackets, means for supporting the plates to be welded, horizontal pressure-exerting members carried by said pillars and beams for closing the plates for welding, and a vertically-adjustable staging supported by said pillars.

5. In the welding of structures, composed of strakes of plating attached to and supported by rigid frames, wherein the welding is proceeded with in a separate, sectional and spreading maner from the centre or one end of each plate outwards in lateral and longitudinal directions, the use of adjustable non-perforating pressure appliances comprising movable upwardly-extensible pillars erected externally and internally of the structure, means for temporarily anchoring said pillars thereto, adjustable brackets carried by said pillars, adjustable beams carried by said brackets, means for supporting the plates to be welded, and horizontal pressure-exerting members carried by said pillars and beams for closing the plates for welding.

In testimony whereof I have signed my name to this specification.

ROBERT ROBERTS